United States Patent [19]

Auracher et al.

[11] 4,432,325
[45] Feb. 21, 1984

[54] ELECTRONIC CONTROL SYSTEM FOR INTERNAL COMBUSTION ENGINES

[75] Inventors: Gerd Auracher, Grossbottwar; Albrecht Clement, Kornwestheim; Rolf Däumer, Weil d. Stadt; Helmut Schwarz; Thomas Theml, both of Vaihingen; Wilfried Venzke, Möglingen; Gustav Virgilio, Winnenden; Bernhard Weichel, Stuttgart; Thomas Wilfert, Ludwigsburg, all of Fed. Rep. of Germany

[73] Assignee: Robert Bosch GmbH, Stuttgart, Fed. Rep. of Germany

[21] Appl. No.: 318,765

[22] Filed: Nov. 6, 1981

[30] Foreign Application Priority Data

Nov. 8, 1980 [DE] Fed. Rep. of Germany ....... 3042245

[51] Int. Cl.³ .......................... F02N 17/00; F02P 5/04
[52] U.S. Cl. ................. 123/491; 123/179 G; 123/424
[58] Field of Search ............ 123/424, 179 L, 491, 123/179 G

[56] References Cited

U.S. PATENT DOCUMENTS 3,923,031 12/1975 Keranen ................ 123/179 L
4,069,795 1/1978 Long ..................... 123/491
4,114,570 9/1978 Marchak ............... 123/179 L
4,137,871 2/1979 Martel .................. 123/491
4,148,282 4/1979 Grassle ................. 123/491
4,184,460 1/1980 Harada ................. 123/491
4,205,635 6/1980 Kirn ..................... 123/491
4,239,022 12/1980 Drews ................... 123/491

Primary Examiner—Ronald B. Cox
Attorney, Agent, or Firm—Edwin E. Greigg

[57] ABSTRACT

An electronic control system for internal combustion engines which has signal generator circuits for the fuel metering and for the ignition. During starting, especially in the case of cold starting, three different phases are provided for controlling the injected fuel quantity and for regulating the fuel quantity downward; furthermore, the ignition angle is adjusted in accordance with temperature and rpm. In terms of the fuel metering, the boundary between the first and second phase is dependent on the rpm or on a maximum total number of revolution cycles, and the end of the second phase is predetermined by a minimum metering signal which is dependent on temperature. In the ignition system, there is an increasing adjustment toward "early" approximately in the rpm range between 200 and 600 revolutions per minute as well as an increasing adjustment toward "late" as the temperature increases.

14 Claims, 6 Drawing Figures

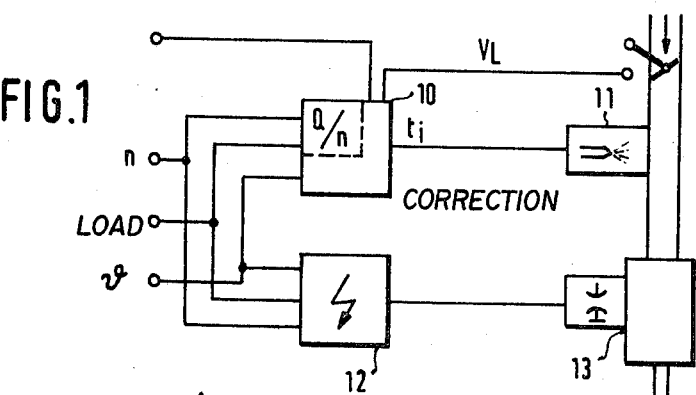
FIG. 1
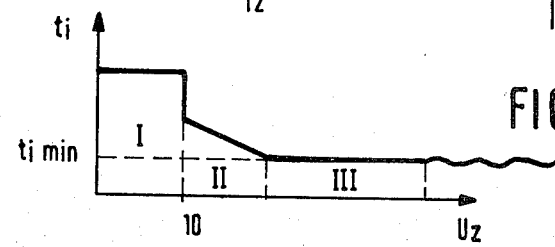
FIG. 2
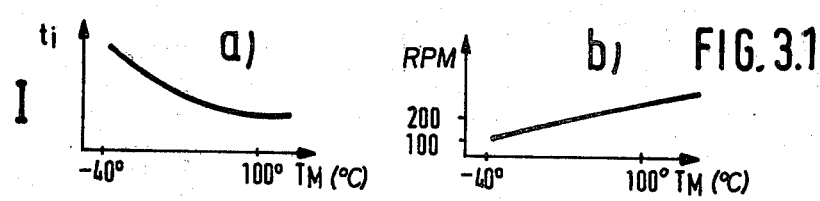
FIG. 3.1
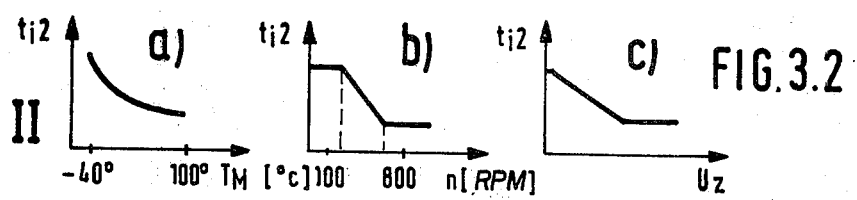
FIG. 3.2
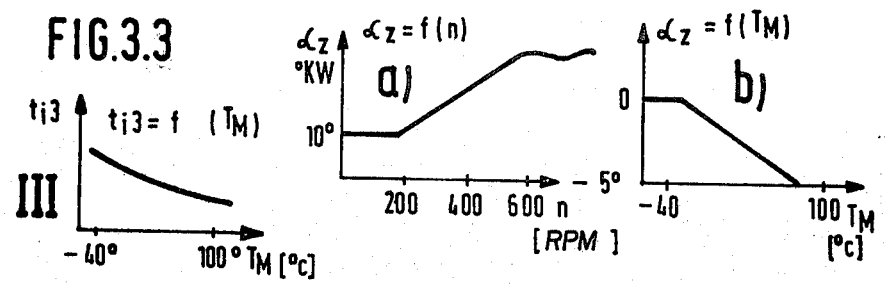
FIG. 3.3
FIG. 4

ELECTRONIC CONTROL SYSTEM FOR INTERNAL COMBUSTION ENGINES

BACKGROUND OF THE INVENTION

The invention relates to an electronic control system for internal combustion engines which has signal generator circuits for fuel metering and for ignition.

It has long been known to meter an additional quantity of fuel during starting of an internal combustion engine, especially in the lower temperature range, in order to compensate for losses caused by condensation on the cold inner walls of the intake tube and the cylinders. It is also known for this additional quantity to be selected in accordance with temperature and to be regulated downward in accordance with rpm and with time.

The same is true in the field of ignition; here, again, adjustments in ignition timing during starting which are made in accordance with rpm are known in the prior art.

As exhaust emission regulations become more and more stringent, and in view of the demand for better and better engine starting and for the lowest possible fuel consumption, known control systems have proved not to be optimally capable of meeting these needs.

OBJECT AND SUMMARY OF THE INVENTION

With the control system for internal combustion engines according to the invention, the above demands can be met in the best possible way. Engines controlled with this system are distinguished by the smoothness and reliability with which they start.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 is a schematic circuit diagram of an electronic control system for an internal combustion engine;

FIG. 2 is a diagram explaining the enrichment during an engine starting period in the case of a fuel injection system;

FIGS. 3.1a & b and 3.2a, b, & c include various diagrams relating to correction factors for the metered fuel quantity during the engine starting period; and FIG. 4 includes diagrams relating to correction factors for the ignition angle during the engine starting period.

DESCRIPTION OF THE PREFERRED EMBODIMENT

The following discussion will pertain especially to signal generation during starting, in an electronic control system for internal combustion engines. In this system, the fuel is metered via injection valves which are intermittently triggered with signals of modulated pulse length.

According to FIG. 1, the electronic engine control system has a fuel injection signal generator circuit 10 for generating fuel injection pulses ti, which in turn trigger injection valves 11, and an ignition signal generator circuit 12 for generating ignition signals which respectively trigger spark plugs 13. The critical input variables for the two signal generator circuits 10 and 12 are furnished by sensors for rpm, for temperature, and in the case of starting, possibly for load. The injection signal generator circuit 10 is also furnished with a starting signal.

The purpose of the arrangement shown in FIG. 1 is solely to illustrate clearly the area in which the invention functions. The actual invention resides in the selection of function courses during starting with resepct to the quantity of fuel to be metered and to the instant of ignition.

A realization of the invention in terms of circuitry has therefore been omitted, because modern engine control systems are computer-controlled, and the various functions and values can be pulled up from a memory at specified points in the program.

FIG. 2 shows the principles of the invention in terms of fuel metering. The duration of the injection pulses $t_i$ is plotted in FIG. 2 over the number of revolutions $U_2$. Three ranges I, II and III are seen in the diagram, each having different injection values.

In the present case, "starting" refers to the situation where either the starting switch is closed or, if the ignition has been switched on, then the rpm is still lower than that required for the engine to turn over. The end of starting is indicated in FIG. 2 by the end of range III; this is followed by the post-starting phase.

As shown is FIG. 2, a relatively large quanitity of fuel is injected at the onset of starting. This occurs effecaciously by generatinf one injection pulse of duration ti per ignition—or in other words per cylinder as the cylinder is opening—and by opening the injection valves in common by way of all the cylinders in a corresponding manner. In the specific example illustrated by FIG. 2, a fixed value is selected for the injection time $t_i$ during the course of range I, and this fixed value is selected in accordance with temperature $T_M$ as shown in FIG. 3.1a. Range I ends after an rpm threshold has been exceeded, in accordance with the engine temperature $T_M$ as illustrated by way of example on FIG. 3.1b, and in any event range I ends at the latest after a certain number of revolutions, 10 for example, have taken place; the purpose of this is the reliable avoidance of cylinder flooding.

In range II, the injection quantity $t_{i2}$ is then reduced to a minimum value in accordance with temperature ($T_M$), rpm (n), and total number of revolutions ($U_2$). It is not necessary that all three parameters $T_M$, n, $U_2$ be taken into consideration to effect this downward regulation procedure. Examples of initial values as well as downward regulation curves are given in FIGS. 3.2a, b, and c. Even if FIG. 3.2a matches FIG. 3.1a, the two different characteristic curves are still intended to indicate the opportunity of selecting the initial value for range II in accordance with temperature $T_M$ but differently from the selection made in range I.

FIG. 3.2b illustrates the downward regulation of the fuel quantity $t_{i2}$ over the rpm (n) during the course of range II. According to this curve, the injection quantity $t_{i2}$ is a constant value until the rpm increases to approximately 100; as the rpm further increases, the injection quantity is reduced in linear fashion until a final value is attained at approximately 600 revolutions per minute.

The further downward regulation shown in FIG. 3.2c and effected in accordance with the total number of revolutions $U_2$ of an engine shaft such as the crankshaft takes place in linear fashion and finally becomes a constant value. The boundary between ranges II and III is determined by a minimum fuel quantity value ($t_i$ min) which is then adhered to until the end of the starting phase. The poststarting phase and the warmup phase then begins. The minimum fuel quantity (ti min) is efficaciously selected in accordance with the engine temperature $T_M$ as shown in FIG. 3.3.

Because it is possible to adapt the fuel metering during starting in such a finely graduated manner, the individual criteria can be optimized; the result is good starting behavior and cost-favorable operation of the engine.

If because of some defect or other the spark plugs nevertheless become wet with fuel, a drying process can be initiated by interrupting the fuel metering cycles. This can be attained in an advantageous manner by causing the throttle valve to open, and the fuel interruption can be controlled by linking the full-load signal with a starting signal $V_L$ by means of logic circuitry.

According to FIG. 4, the ignition angle $\alpha Z$ is adjusted toward "early" in accordance with rpm and engine temperature $T_M$ during starting, in order to promote combustion. Reliable starting and smooth turnover of the engine are attained by this means as well, in a manner corresponding to the procedures described above in combination with the fuel metering. According to FIG. 4a, the ignition angle $\alpha Z$ is adjusted continuously toward "early" in the range between approximately 200 and 600 rpm, beginning with a specific value; the extreme values are found at crankshaft angles ° KW of approximately 10° and 20°. The adjustment of ignition angle $\alpha Z$ shown in FIG. 4b is added to this. From the curve shown in FIG. 4b, it may be seen that the temperature-dictated ignition angle adjustment at a very low temperature is zero, and at an higher temperature such as +80° C. it is retracted to −5° of crankshaft angle.

The two characteristic curves shown in FIG. 4 act in additive fashion; that is, they are superimposed on one another. Thus a starting procedure at −40° C., for example, takes place on the basis of an ignition angle $\alpha Z$ = 10°, while in the case of a hot start at approximately 80° C., the initial ignition angle $\alpha Z$ amounts to only about 5° of crankshaft angle.

Above approximately 600 rpm, the idling rpm level is then attained. The starting process may now be considered as having been completed, and the ignition angle is adjusted in accordance with generally known criteria; for instance, the load is also now included among these criteria.

The distribution of the fuel quantity, in the example described above, is such that the injection valves of all the cylinders open simultaneously; in other words, fuel is pre-stored in those cylinders not being actuated at that time. However, the functions can also be applied to injection systems in which only the cylinder actually opening at a particular time is supplied with fuel.

The downward regulation during range II which is described above can also be effected as an arbitrary function over the number of revolutions; alternatively, it can also function as a means of upward regulation, depending upon the engine and the fuel requirement.

Instead of being effected to a minimum, temperature-dependent fuel quantity value as described above, it is also possible to effect regulation downward to range III to a value upon which not only the temperature function but an rpm function as well has been superimposed.

The foregoing relates to a preferred exemplary embodiment of the invention, it being understood that other embodiments and variants thereof are possible within the spirit and scope of the invention, the latter being defined by the appended claims.

What is claimed and desired to be secured by letters patent of the United States is:

1. An electronic control system for an internal combustion engine having fuel metering means for metering fuel to the engine in accordance with a fuel metering signal and ignition means for initiating combustion of fuel within the engine in accordance with an ignition signal, which comprises:

fuel metering control means for generating said fuel metering signal during an engine starting period such that the metered fuel quantity is maintained at a first constant value during a first phase of an engine starting period, the metered fuel quantity is changed from a second value to a threshold in accordance with at least one of the engine variables of temperature, rpm, and total number of revolutions during a second phase of the engine starting period, and the metered fuel quantity is maintained at said threshold value during a third phase of said engine starting period, the duration of said first phase depending upon the occurrence of one of selected values of the engine variables of rpm and total number of revolutions; and ignition control means for generating said ignition signal such that the time of ignition is adjusted toward "early" from a reference ignition time in accordance with at least one of the engine variables of rpm and temperature.

2. An electronic control system for an internal combustion engine, as described in claim 1, wherein said first constant value of the metered fuel quantity, which is maintained during the first phase of the engine starting period, is a constant value which is dependent upon the engine temperature.

3. An electronic control system for an internal combustion engine, as described in claim 1, wherein said threshold value of the metered fuel quantity, which is maintained during the third phase of the engine starting period, is a value which is dependent upon the engine temperature.

4. An electronic control system for an internal combustion engine as defined by claim 1, wherein the end of the first phase is determined by a temperature-dependent rpm value.

5. A control system as defined by claim 1, wherein an rpm-dependent downward regulation of the metered fuel quantity is effected by said fuel metering control means during said second phase in an rpm range of preferably 100 to 600 revolutions per minute.

6. A control system as defined by claim 1, wherein during said second phase, said fuel metering control means effects a downward regulation of the metered fuel quantity dependent on the total number of revolutions, which is initially steep and then takes a flatter course or enters a constant range.

7. A control system as defined by claim 1, wherein during the engine starting period the ignition is adjustable by the ignition control means toward "early" in accordance with rpm and toward "late" in accordance with temperature.

8. A control system as defined by claim 7, wherein the rpm-dependent adjustment toward "early" is effected in a range of approximately 200 and 400 revolutions.

9. A control system as defined by claim 7, wherein the temperature-dependent adjustment of the ignition toward "late" is effected whenever the temperature exceeds a minimum value above approximately −20° C.

10. A control system as described in claim 1 wherein said engine includes a plurality of combustion cylinders and said fuel metering means comprises a like plurality of fuel injection valves which are activated by injection pulses constituting said fuel metering signal to meter and inject fuel into said cylinders, respectively, characterized in that during said engine starting period, an injection pulse arrives at all injection valves upon the occurrence of an ignition process in one cylinder, to effect pre-storage of fuel in those cylinders not being actuated.

11. A control system for an internal combustion engine as defined by at least one of the claims 1-9, wherein said engine comprises a plurality of combustion cylinders, a like plurality of spark plugs constituting said ignition means for respectively initiating combustion within said cylinders, air intake throttle valve means for metering combustion air to said cylinders, including means for generating a full load signal when said throttle valve means is disposed in an open position, and starting signal means for generating a starting signal during said starting period, characterized in that in order to blow wetter spark plugs dry, said throttle valve means is opened and the fuel metering operations interrupted, said control system including logic circuitry for controlling the fuel interrupted linkage of the starting and full load signals.

12. A control system for an internal combustion engine as defined by at least one of the claim 1-9, wherein said engine includes a plurality of combustion cylinders and said fuel metering means comprises a like plurality of fuel injection valves which are activated by injection pulses constituting said fuel metering signal to respectively meter fuel to said cylinders, characterized in that during the engine starting period, upon the occurrence of an ignition process in one cylinder, an injection pulse arrives at the injection valve of a cylinder which is opening.

13. A control system as defined by claim 1, characterized in that the metered fuel quantity versus time curve course during the second phase exhibits an arbitrary function over the number of revolutions, and in particular exhibits an upward regulation dependent on the total number of revolutions.

14. A control system as defined by claim 1, characterized in that the fuel metering signal value which is in effect during the third phase exhibits a dependency on rpm.

* * * * *